June 5, 1934.   C. J. SCHNEIDER   1,961,172
FOOD SLICER
Filed April 28, 1933
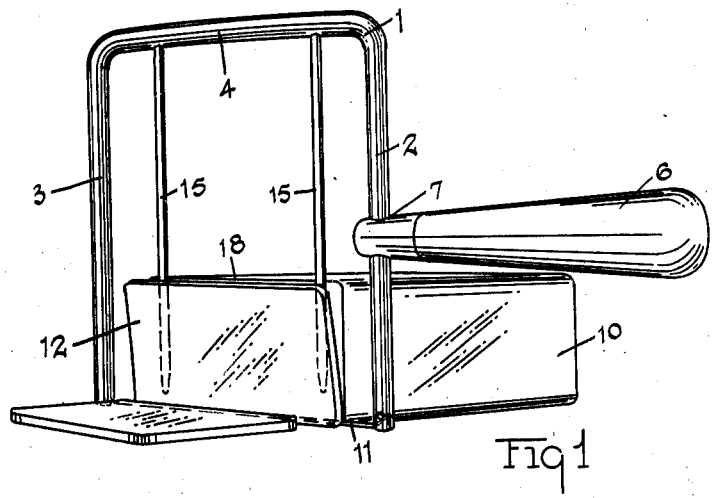
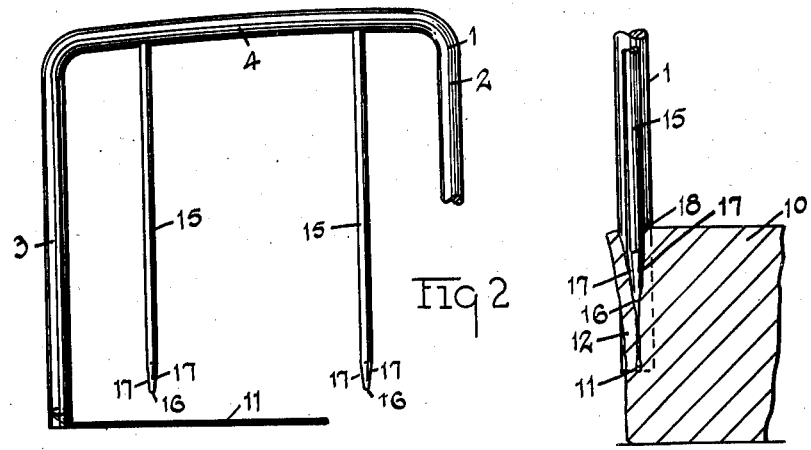
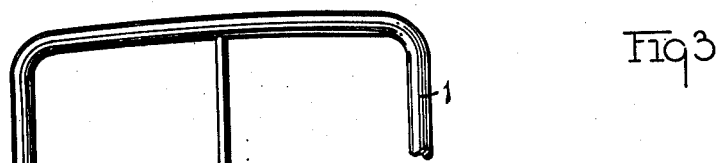
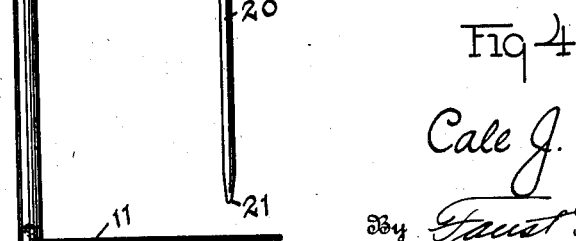
Inventor
Cale J. Schneider
By Faust F Crampton
Attorney Patented June 5, 1934

1,961,172

UNITED STATES PATENT OFFICE 1,961,172

FOOD SLICER

Cale J. Schneider, Toledo, Ohio

Application April 28, 1933, Serial No. 668,426

5 Claims. (Cl. 31—31)

My invention relates to a device or utensil for dividing a material body into parts or slices susceptible of handling, as in the service or consumption of food bodies and the like. The invention particularly relates to a utensil for severing or dividing substances or materials having gelatinous of mucilaginous characteristics, such as cheese, butter, cooked eggs, and the like, in which, even though the body of or unit of the material be severed into distinct pieces or parts, the severed parts tend to remain closely in adjacent positions so as to, for all intents of separation, be as though unsevered.

The invention has for its object to provide a device which will easily sever and divide materials of a flaccid moldability without destroying the shape or form of the material body or unit as by squashing or distorting. The invention has for another object to provide means for severing materials and means for distinctly moving or wedging the severed piece away from the material body successively and progressively with the severing action.

The invention has for a particular object to provide a food utensil having a severing element of small surface area which may be easily moved through the material, and an element located in a following position with reference to the line of severing movement of the severing element and adapted to enter between the severed piece and body of the material operated on, whereby the piece will be, in effect, wedged away from the body and so maintained till the termination of the severing operation. The invention further provides means for guiding the severing element through the materials and for directing the separating or wedging means in the line of movement of the severing element.

The invention therefore provides a device the use of which permits the slicing of flaccid, moldable materials with but very slight thickness, and the delivery and separation of such slices without tearing or destroying the form of the slice or body.

The invention consists of other features and advantages which will appear from the following description and upon examination of the drawing. Structures containing the invention may partake of different forms and may be varied in their details and still embody my invention. To illustrate practical applications of the invention, I have selected a food slicer embodying the invention and a modified form thereof as examples of the various structures and details thereof that contain the invention, and shall describe the selected structures hereinafter, it being understood that variations may be made without departing from the spirit of the invention. The particular structure selected is shown in the accompanying drawing.

Fig. 1 illustrates a perspective view of the food slicer chosen for purposes of illustration. Fig. 2 illustrates a fragmentary side view of the slicer shown in Fig. 1. Fig. 3 illustrates an enlarged view of a section of the slicer shown in Fig. 1 showing the action of slicer parts on a material body. Fig. 4 illustrates a fragmentary view of a modified form of the food slicer.

The dividing and separation of divided pieces of materials, such as cheese, butter and the like, by means of cutting tools, such as knives, is commonly known to require the exercise of a considerable skill, first, in the severing of the piece so as not to crush or squash either the severed piece or the body of the material by reason of the ready moldability and flaccid resistance of the material and, second, in separating the divided pieces or slices from the body so as not to break or tear the piece or slice by reason of the characteristic mucilaginous and adhesive attraction between the pieces and the body which tend to resist separation. Various expedients have been resorted to in order to cope with such difficulties and to effect use of the materials, such as severing the body into bulky and somewhat untasty slabs or cubes.

Also, utensils have been devised for directing a fine wire element through the body to sever the body into pieces and overcoming thereby the tendency of the material to spread out or squash, but failing to provide means for physically separating the pieces from each other or the body.

A utensil partaking of the features of my invention has a frame part and a cutting element embodied in a metal strand or wire, preferably drawn tautly, and supported by the frame. The surface of the wire or strand may be serrated or toothed if desired for cutting through a crust or foil cover commonly found on dairy products and the like. A tine or pin member is supported by the frame and terminates at a position of spaced relation to the cutting element. The frame may be provided with means for guiding the cutting element into and through the material to be severed and directing the pin along the line of severance and between the severed pieces. If desired, the terminus of the pin may have converging surfaces whereby a wedging action is effected along the line of severance and operating to separate the severed pieces progressively along the line of severance, thereby tending to prevent the cutting element from becoming jammed or clotted with clingable portions of the material operated on. The body of the pin is of sufficient cross sectional dimension so as to definitely maintain the severed pieces in separated positions. The pin member also forms a convenient guide and indicator of the direction of cutting progression of the cutting element through the body of the material, thereby enabling a user to attain straight line cuts, for, as the cutting element is guided away from a straight line of cutting, the pin member will tend to engage one of the upper edges of surface severed, immediately indicating a change of course of the cutting element and enabling the user to correct the direction of movement.

One of the preferable forms of construction embodying my invention, has a pair of the above described pin elements, thereby providing an exceedingly efficient utensil for the handling and distributing of the severed piece from the place of severance to a place of use as, for example, to a plate or sandwich. It will be seen that the pins may be conveniently disposed on the frame so that after the cutting element has passed completely through the material, the frame may be moved angularly, moving the cutting element away from the body of the material and effectively "scooping" the slice so as to permit it to fall by its own weight against the pin members and be thereby cooperatively supported for distribution.

The form of construction illustrated in the accompanying drawing has a frame 1. The frame 1 is preferably formed of cold-rolled steel, bent generally in a U-shape and having leg portions 2 and 3, and a web portion 4. The frame 1 is provided for ease of manipulation and directive movement with a suitable handle 6 that may be connected to the leg portion 2, as at 7.

In order to provide a cutting element for severing materials to be operated on, such as the brick of cheese 10, pictorially represented in Figs. 1 and 3 of the drawing, a strand or wire 11 is located over the open end of the U-shaped frame 1 and extends between the leg portions 2 and 3. The strand or wire 11 is preferably formed of light-gauge metal and is drawn tautly between the leg portions so as not to give or slack upon movement thereof through the cheese 10. Thus, it will be seen that the cutting element may be moved laterally through the cheese body or brick 10 and guided by manipulation of the frame 1 so as to sever a piece or slice 12 from the brick 10.

The slice 12 would, however, as is well known, tend to stick to the body or brick 10 by reason of not only the viscid character of the material, but also by reason of the presence of certain quantities of moisture contained in the material which quantities exert a relatively strong composite surface tension to maintain a fixed body and slice relation. The frame 1 is, therefore, provided with a plurality of pin elements 15. Each pin element is connected to the web portion 4 of the frame 1 and extends towards the cutting element wire 11, terminating at a point in spaced relation to the wire 11. Each pin element is, preferably, provided with a tip portion 16 that has surfaces 17, preferably converging to form, in a nature, a wedge. Thus, as the pins are moved in the line of severance made by the wire 11, the slice 12 will be increasingly moved apart from the brick 10 to gradually overcome the adhesional attraction between the slice 12 and the brick 10.

In operation the user may place the brick 10 on a surface to be severed and, grasping the handle 6, guide the frame so as to move the wire 11 through the brick, maintaining the pins 15 and their tips 16 in substantially axial alignment with the line of movement of the wire and so as to pass between the slice and brick. In this connection, should the user fail to maintain the pins as described, the body portion of the pins 15 will engage the edge, such as the edge 18, of the severed surface of either the brick or the slice, depending in which direction away from the line of severance the frame is angularly moved and thereby indicating to the user the direction of movement of the cutting wire 11 and enabling the slicing of straight surfaced cuts, important in the economical use of such materials, and the appealing tastiness of foods. The delivery of the slice 12 may be effected by rotating the handle so as to move the wire 11 away from the brick 10, permitting the slice to fall onto the pins 15 where it can be carried to a place of use.

In the modified form illustrated in Fig. 4, the U-shaped frame 1 is provided, as before, and supports a wire 11 for cutting materials. A single pin member 20 is connected to the frame 1 and extends to a point in spaced relation to the cutting wire 11. The pin member has a tip portion 21 similar to the tip portions 16 of the pins 15 and operates in a similar manner.

I claim:

1. A material slicer comprising a handle-supported relatively rigid substantially U-shaped frame, a slender cutting member extending across the open end of the U-shaped frame and secured at its ends to the ends of the U-shaped frame, a pin member of a substantially uniform cross-sectional dimension projecting at right angles to the cutting member from the base of the U-shaped frame towards and to a point spaced from the sides of the frame and in the vicinity of the cutting member and forming a guide for the slicer to enable substantial maintenance of the direction of movement of the cutting member constantly in a single plane during the movement of the cutting member while slicing and for maintaining separation between the portion of the material severed and the portion of the material from which it is severed.

2. A material slicer comprising a handle-supported relatively rigid substantially U-shaped frame, a slender cutting member extending across the open end of the U-shaped frame and secured at its ends to the ends of the U-shaped frame, a second member projecting lengthwise from the base of the U-shaped frame towards and to a point in proximity to the cutting member and spaced from the cutting member and the sides of the frame, the said second member having a dimension transverse to the plane of the frame and the cutting member that is substantially uniform throughout the length of the said second member for maintaining separation between the portion of the material severed and the portion from which it is severed by the cutting member and preventing material displacement of the portion of the material from the portion from which it is severed.

3. A material slicer comprising a handle-supported relatively rigid substantially U-shaped frame, a slender cutting member extending across the open end of the U-shaped frame and secured at its ends to the ends of the U-shaped frame, a material separating member projecting substantially at right angles to the cutting member from a point on the base of the frame and spaced from the sides of the frame, the said member extending towards and to a point in the vicinity of the cutting member and forming a guide for the material slicer to enable substantial maintenance of the direction of movement of the cutting member constantly in a single plane during the movement of the cutting member while slicing and for maintaining separation between the portion of the material severed and the portion of the material from which it is severed without material displacement thereof.

4. In a material slicer a handle-supported relatively rigid substantially U-shaped frame, a slender cutting member connected to the frame and extending between the opposite ends of the frame, a pair of slender pins of substantially uniform cross-sectional area throughout their lengths connected to the base of the U-shaped frame and spaced from the sides of the frame and from each other, the pins extending at right angles to the cutting member and to a point in proximity with the cutting member.

5. A material slicer comprising a handle-supported relatively rigid substantially U-shaped frame, a cutting member extending across the open end of the U-shaped frame, a plurality of straight pin members of substantially uniform cross-section projecting at right angles from the base of the U-shaped frame towards and to a point in the vicinity of the cutting member and spaced from each other and the sides of the frame forming guides for the slicer to enable substantial maintenance of the direction of movement of the cutting member constantly in a single plane during the movement of the cutting member while slicing and for maintaining separation between a portion of the material severed from the portion of the material from which it is severed, and whereby the first named portion of the material may be subsequently supported and served on the pin members.

CALE J. SCHNEIDER.